United States Patent
De Boer (10) Patent No.: US 10,479,714 B2
(45) Date of Patent: Nov. 19, 2019

(54) PECTIN COMPRISING EFFERVESCENT COMPOSITIONS

(71) Applicant: Dalli-Werke GmbH & Co. KG, Stolberg (DE)

(72) Inventor: Robbert De Boer, Oene (NL)

(73) Assignee: Dalli-Werke GmbH & Co. KG, Stolberg (DE)

( * ) Notice: Subject to any disclaimer, the term of this patent is extended or adjusted under 35 U.S.C. 154(b) by 41 days.

(21) Appl. No.: 15/533,368

(22) PCT Filed: Dec. 4, 2015

(86) PCT No.: PCT/EP2015/078652
§ 371 (c)(1),
(2) Date: Jun. 5, 2017

(87) PCT Pub. No.: WO2016/087639
PCT Pub. Date: Jun. 9, 2016

(65) Prior Publication Data
US 2017/0320764 A1    Nov. 9, 2017

(30) Foreign Application Priority Data
Dec. 5, 2014   (EP) .................................. 14196577

(51) Int. Cl.
*C11D 3/22*   (2006.01)
*C02F 5/10*   (2006.01)
*C11D 3/00*   (2006.01)
*C11D 3/04*   (2006.01)
*C11D 3/10*   (2006.01)
(Continued)

(52) U.S. Cl.
CPC ............ *C02F 5/105* (2013.01); *C11D 3/0052* (2013.01); *C11D 3/042* (2013.01); *C11D 3/10* (2013.01); *C11D 3/2075* (2013.01); *C11D 3/2086* (2013.01); *C11D 3/222* (2013.01); *C11D 17/0073* (2013.01); *C11D 17/06* (2013.01)

(58) Field of Classification Search
CPC ......................... C11D 17/0078; C11D 17/0082
USPC .................................................. 510/224, 445
See application file for complete search history.

(56) References Cited

U.S. PATENT DOCUMENTS 5,837,663 A * 11/1998 Nicholson ............ C11D 3/3945
                                                                510/226
5,900,395 A *  5/1999 Nicholson .......... C11D 3/38609
                                                                510/224
(Continued)

FOREIGN PATENT DOCUMENTS

DE       21 32 862 A1    1/1973
DE      197 45 964 A1    6/1998
(Continued)

*Primary Examiner* — Gregory E Webb
(74) *Attorney, Agent, or Firm* — Knobbe, Martens, Olson & Bear, LLP (57) ABSTRACT

A water softener, detergent compositions and co-granulates contain an effervescent agent and pectin. Unit portions contain the co-granulates or compositions. The compositions or co-granulates can be used in a water-soluble and/or water-dispersible water softening, cleaning or detergent formulations, and pectin can be used to stabilize effervescent tablets. The effervescent agent can contain an acidic component such as a tricarboxylic acid, a dicarboxylic acid other than tartaric acid, inorganic acids, and a basic component.

28 Claims, 1 Drawing Sheet

(51) Int. Cl.
*C11D 3/20* (2006.01)
*C11D 17/00* (2006.01)
*C11D 17/06* (2006.01)

(56) References Cited

U.S. PATENT DOCUMENTS

| | | | |
|---|---|---|---|
| 7,084,102 B1 * | 8/2006 | Arnau | C11D 3/1253 510/294 |
| 2003/0114349 A1 * | 6/2003 | Pena Romero | C11D 3/2082 510/447 |
| 2004/0116317 A1 | 6/2004 | Burt et al. | |
| 2008/0274931 A1 | 11/2008 | Pham | |

FOREIGN PATENT DOCUMENTS

| | | |
|---|---|---|
| EP | 286 085 A1 | 10/1988 |
| WO | WO 96/33694 A1 | 10/1996 |
| WO | WO 98/24873 A1 | 6/1998 |

* cited by examiner

PECTIN COMPRISING EFFERVESCENT COMPOSITIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to water softener or detergent compositions and co-granulates comprising an effervescent agent and pectin, unit portions comprising said co-granulates or compositions, use of said compositions or co-granulates in water-soluble and/or water-dispersible water softening, cleaning or detergent formulations and to the use of pectin to stabilize effervescent tablets.

Description of the Related Art

Tabletted detergent compositions or detergent compositions in unit portions have become increasingly popular as they are easy to handle and avoid over- or under-dosing and spillage of detergent. However, one major disadvantage is that tablets and other unit portions are often compressed or compacted and therefore do not always disintegrate, dispense or dissolve satisfactory in the washing water. This results in an inefficient delivery of the active agents to the wash, in lumping of the product in the washing machine or dish washer and in deposition of product onto fabric or tableware. One solution for this problem presented in the prior art is the incorporation of effervescent agents into the tablet, which form gas upon contact with water and thereby contribute to improved disintegration, dissolution and dispersion of the tabletted or portioned composition.

The use of effervescent agents advantageously allows the very rapid disintegration, dispensing and dissolution of the solid dosage forms, such as tablets and other unit portions. In addition, after dissolving, minimal to none manipulation is needed in order to ensure appropriate mixing of the constituents including the active agents of the solid dosage compositions, in particular tablets, such that uniform applications can be assured with the reconstituted aqueous solutions, including water softening, cleaning and detergent solutions.

However, tablets/unit portions comprising effervescent agents based on an acid-base system are difficult to store, especially in a humid or moist environment as too high air humidity can already start the effervescent reaction which results in physical instability of the tablet or unit portion.

Thus, tablets/unit portions comprising effervescent agents are often particularly difficult to store over a period of several weeks up to months unless ingredients with decreased moisture content, i.e. with a moisture content ranging from 0 to 3 wt.-% of the dry compound are utilized for tablet production. Tablets made of compounds with normal moisture content, i.e. ranging from 0.5 to 15 wt.-% of the dry compound show often limited stability during storage, i.e. exhibit swelling and crumbling during a few weeks of storage.

To avoid water contact and allow prolonged storage, tabletted effervescent compositions are often packaged in water proof paper, water insoluble films or foil, as recommended for example in DE 19745964 A1.

Further attempts to increase stability of effervescent detergent tablets include coating of the tablets. To increase stability, particularly abrasion stability of effervescent detergent tablets, WO 98/24873 A1 proposes to apply a thin but hard coating that is readily dissolvable when the tablet is in the washing machine.

SUMMARY OF THE INVENTION

The object of the present invention is to provide a simple but storage stable particulate or unit portioned/tabletted effervescent detergent, cleaning or water softener composition that allows the incorporation of ingredients with normal moisture content. Preferably a coating is required to achieve the desired stability.

This object is met by the water softener, detergent or cleaning compositions and co-granulate(s) according to the invention. The water softener, cleaning or detergent compositions according to the present invention comprise an effervescent agent and pectin.

In the present application, the inventors have found, that adding pectin to a water softener, cleaning or detergent composition remarkably increases tablet stability of a tablet pressed from said composition by prolonging storage time and furthermore allows the use of ingredients of normal moisture content in an effervescent comprising composition without starting the effervescent reaction.

DETAILED DESCRIPTION OF THE INVENTION

The terms "comprising", "comprises" and "comprised of" as used herein are synonymous with "including", "includes" or "containing", "contains", and are inclusive and open-ended and do not exclude additional, non-recited members, elements or method steps. It will be appreciated that the terms "comprising", "comprises" and "comprised of" as used herein comprise the terms "consisting of", "consists" and "consists of".

Effervescent Agent

The term "effervescent agent" relates to a compound or mixture of compounds which result in the generation and release of a gas when administered to a liquid or when in contact with a liquid. Any effervescent agent known in the art may be used according to the invention. Preferably, the term "effervescent agent" refers to an agent comprising an acidic and a basic component, preferably components capable of reacting to form a gaseous species, such as for example carbon dioxide or oxygen, upon contact with a liquid, e.g. water.

In the composition according to the invention the effervescent agent is preferably present in an amount ranging from 1 to 99 wt.-%, dependent from the type of composition, e.g. a water softener, a cleaning or a detergent composition. In a water softener composition the effervescent agent can represent 50 to 99 wt.-%, preferably 60 to 98 wt.-%, more preferred 70 to 95 wt.-%, wherein particularly preferred is an amount ranging from 80 to 99 wt.-%, based on the total weight of the water softener composition. A cleaning or detergent composition may comprise the effervescent agent in an amount of 0.05 to 30 wt.-%, preferably 0.1 to 25 wt.-%, more preferred 0.5 to 20 wt.-%, even more preferred 1 to 15 wt.-% or 2 to 10 wt.-% of the cleaning or detergent composition Each individual ingredient of the effervescent agent according to the invention is soluble in water of 20° C. up to at least 5 gram per 100 ml.

The acidic component is preferably selected from tricarboxylic acids, dicarboxylic acids except tartaric acid, including unsaturated dicarboxylic acids, inorganic acids, and salts thereof or derivatives thereof, e.g. naturally occurring unsaturated variants of the acids cited below (like e.g. aconitic acid, an unsaturated variant of citric acid). Examples of suitable acidic components of the present invention include citric acid, isocitric acid, oxalic acid, malonic acid, succinic acid, glutaric acid, malic acid, adipic acid, amidosulfonic acid, maleic acid, glutaconic acid, acrylic acid, methacrylic acid, mono sodium citrate, di sodium citrate; one particularly preferred acidic component is citric acid or salts thereof, even more preferred is anhydrous citric acid.

The acidic compound in this invention is most preferably anhydrous. Further the acidic compound is preferably free of Ca and Mg ions (this means no components are included comprising Ca or Mg as counter-ions).

According to the invention the acidic component of the effervescent agent is preferably present in an amount ranging from 9 wt.-% to 98 wt.-%, preferably in an amount ranging from 25 wt.-% to 97 wt.-%, more preferably in an amount ranging from 40 wt.-% to 96 wt.-%, even more preferred 60 to 95 wt.-% and most preferably in an amount ranging from 70 to 95 wt.-% based on the total weight of the effervescent agent.

According to the invention the acidic component of the effervescent agent is preferably present in an amount of at least 25%, more preferably at least 40% and most preferably at least 50% based on the weight of the total water softener, cleaning or detergent composition. Preferably a water softener composition comprises such high amounts of the acidic component of the effervescent agent. Thus, said composition may comprise the acidic component in an amount of up to 80 wt.-%, up to 75 wt.-% or up to 70 wt.-%.

The basic component is preferably selected from carbonates, bicarbonates, percarbonates, sesquicarbonates, and derivatives thereof including for example sodium and potassium forms, and derivatives thereof; preferred basic components are bicarbonates, particulary preferred are sodium or potassium bicarbonates, even more preferred are anhydrous sodium or potassium bicarbonates.

The basic component is essentially free of calcium of magnesium salts or ions, wherein "essentially free" means that the basic component comprises less than 1% of such ions, preferably less than 0.5%, more preferred less than 0.2%, less than 0.1% or less than 0.05%. Most preferred the basic component is free of such ions.

The basic component in this invention is most preferably anhydrous.

Most preferably, the effervescent agent according to the invention comprises citric acid and sodium bicarbonate or consists of said components.

According to the invention the basic component of the effervescent agent is preferably present in an amount ranging from 2 wt.-% to 91 wt.-%, preferably in an amount ranging from 3 wt.-% to 75 wt.-%, more preferably in an amount ranging from 4 wt.-% to 60 wt.-%, even more preferred from 5 to 40 wt.-% and most preferred from 5 to 30 wt.-% based on the total weight of the effervescent agent.

In a preferred embodiment the effervescent agent consists of the acidic and the basic component.

The ratio of the acidic to the basic component in the effervescent agent preferably ranges from 1:6 to 10:1, more preferably from 1:6 to 6:1, even more preferably from 1:2 to 6:1, most preferably from 1:1 to 4:1 (wt/wt).

The molar ratio of acid groups to carbonate-groups ($CO_3^{2-}$) or bicarbonate-groups ($HCO_3^-$) in the effervescent agent ranges from 8:1 to 1:1, more preferably from 7:1 to 1.25:1, more preferably from 6:1 to 1.5:1, most preferably from 5:1 to 2:1. Preferably the acid groups are carboxylic acid groups.

The molar ratio of tricarboxylic acid to carbonate-groups ($CO_3^{2-}$) or bicarbonate-groups ($HCO_3^-$) in the effervescent agent ranges from 2.7:1 to 0.3:1, more preferably from 2.3:1 to 0.4:1, more preferably from 2:1 to 0.5:1, most preferably from 1.7:1 to 0.7:1.

Preferably, the effervescent agent according to the invention comprises a water content ranging from 0 to 5, preferably from 0 to 4, more preferably from 0 to 3, even more preferably from 0 to 2, still even more preferably from 0 to 1, still even more preferably from 0 to 0.5, and most preferably from 0 to 0.25 wt.-% of the total composition. The water content is defined by the amount of water which evaporates when the composition or components are heated to 105° C.

Pectin or Pectin Comprising Matter

Pectin is a partially esterified poly-galacturonic acid, which comprises methoxy groups. Without wishing to be bound by theory, the inventors assume that the ester group is unstable and available water molecules will therefore react predominantly in ester hydrolysis. Thus presumably, the ester groups exert a scavenging effect on the water molecules in the composition preventing the water molecules from starting the effervescent reaction. Thereby storage stability and storage time are increased.

Pectin according to the present invention comprises all kinds of pectic polysaccharides including, for example, homogalacturonans that comprise linear chains of □-(1-4)-linked D-galacturonic acid, substituted homogalacturonans including xylo- and apiogalacturonans, and rhamnogalacturonans including polysaccharides with a di-saccharide backbone of □-D-galacturonic acid and □-L-rhamnose; wherein the galacturonic acid groups are partially esterified with methanol. Both types, high-ester pectins, wherein more than 50% of the galacturonic acid groups are esterified, and low-ester pectins, wherein less than 50% of the galacturonic acid groups are esterified, are suitable according to the present invention.

Suitable pectins according to the invention include extracted isolated and/or purified pectins but also include pectin comprising matter or complex pectin comprising mixtures derived from fruits, vegetables or other crops like pomace, fibers, waste, peel, skin, pulp and the like. Preferred are naturally occurring pectins as derivable from plant material, particularly preferably from residual plant material like pomace, fibers, waste, peel, skin, pulp.

Extracted or isolated pectins and pectin comprising matter or mixtures according to the present invention are derivable for example from the following fruits, vegetables and crops: sugar beet, chicory/chicory root, sunflower, rapeseed/rapeseed cake, carrot, citrus peel/citrus fruit including lemon, lime, orange, grapefruit; and non-citrus fruit including for example apple, pear, apricot, guave, mango, plum, grapes, peach, quince, papaya, banana, pineapple, passion fruit and coffee berry without being limited to the mentioned.

The amount of non-substituted pectin in the pectin comprising matter or complex matter or mixtures ranges from 2 to 100 wt.-%, preferably the amount of pectin in the complex matter or mixtures is at least 2, at least 3, at least 4, at least 5, at least 6, at least 7, or at least 8 wt.-% and may range up to 100, 90, 80 or 70 wt.-% based on the total weight of the matter/mixture.

Preferred extracted/isolated pectins and pectin-comprising matter or mixtures according to the present invention are derivable from citrus peel, sugar beet and chicory root, wherein pectin-comprising matter or mixtures are particularly preferred, chicory root fiber is most preferred according to the present invention.

Pectins according to the present invention are obtainable using extraction processes known in the art. These include for example methods using mild organic acid and/or enzymatic extraction of pectin from an aqueous mixture of pectin-comprising plant material, like citrus or lemon peel and may comprise heating to temperatures as high as 100° C., as disclosed for example in US 2014308737 A1 and US 2012309946 A1. Further methods to obtain pectin include extracting pectin from the plant pulp like for example coffee pulp, wherein extraction is performed under acid conditions or alkaline conditions, to provide the pectin comprising extract; followed by enzymatic treatment of the pectin comprising extract, wherein the enzymatic treatment comprises a treatment with one or more enzymes selected from the group consisting of an esterase and a reductase as disclosed for example in WO2014083032 A1. Other known methods to obtain pectin are for example disclosed in DE 40 13 765 A1 and involve the treatment of dried plant material, i. e. sugar beet chips, with ammonia. The amidated pectins are then extracted using water or dilute sodium hydroxide followed by precipitation with acid and further purification. DE 43 13 549 C1 discloses a process for obtaining pectin extract from sugar beet, wherein a starting material containing sugar beet is heated in an acidic, aqueous solution to a temperature between 50° C. and the boiling point, and the liquid pectin extracted in this way is then further processed without precipitation.

Preferred is the use of pectin comprising matter derived from sugar beet.

In any of the compositions according to the invention the pectin or pectin comprising matter may be included in the composition in an amount of 0.05 to 10 wt.-% based on the total weight of the unit portion composition, in particular when or pectin comprising matter of sugar beet is used. More preferably the amount of pectin or pectin comprising matter in such a composition may range from 0.075 to 8 wt.-%, even more preferred from 0.1 to 5 wt.-%, including 0.15 wt.-%, 0.2 wt.-%, 0.25 wt.-%, 0.3 wt.-%, 0.35 wt.-%, 0.4 wt.-%, 0.45 wt.-%, 0.5 wt.-%, 0.55 wt.-%, 0.6 wt.-%, 0.65 wt.-%, 0.7 wt.-%, 0.75 wt.-%, 0.8 wt.-%, 0.85 wt.-%, 0.9 wt.-%, 0.95 wt.-%, 1 wt.-%, 1.1 wt.-%, 1.15 wt.-%, 1.2 wt.-%, 1.25 wt.-%, 1.3 wt.-%, 1.35 wt.-%, 1.4 wt.-%, 1.45 wt.-%, 1.5 wt.-%, 1.55 wt.-%, 1.6 wt.-%, 1.7 wt.-%, 1.8 wt.-%, 1.9 wt.-%, 2.0 wt.-%, 2.1 wt.-%, 2.2 wt.-%, 2.3 wt.-%, 2.4 wt.-%, 2.5 wt.-%, 2.6 wt.-%, 2.7 wt.-%, 2.8 wt.-%, 2.9 wt.-%, 3 wt.-%, 3.5 wt.-%, 4 wt.-%, 4.5 wt.-%.

Particular embodiments of the amounts of pectin or pectin comprising matter preferably present in the water softener, cleaning or detergent composition of the present invention are described below in unit portioned tablets.

Combination of Effervescent Agent and Pectin: Co-Granulate or Intimate Mixture

Preferably, the water softener, detergent or cleaning composition of the present invention comprises a co-granulate or an intimate mixture comprising or consisting of an effervescent agent and pectin.

The term "co-granulate" refers to any kind of particulate material obtainable by granulating two or more substances using known granulation processes, including for example wet granulation, such as spray-drying, fluidized bed granulation, and dry granulation with for example roller compactors. Preferably, in the co-granulate according to the present invention the pectin does not form a closed layer or coating completely surrounding the entire surface of the other substance(s) including the effervescent agent.

Preferably the pectin is co-granulated rather with the effervescent agent by mixing them and granulating them during or after mixing, wherein mixing and granulating may be carried out at the same time. In a preferred co-granulate of the invention, pectin is co-granulated with either the acidic component of the effervescent agent or the basic component of the effervescent agent.

With "intimate mixture" it is meant that the solid, including particulate and powdery ingredients, i.e. effervescent agent and pectin, are uniformly mixed, preferably without being chemically bonded to each other or reacting with each other so that the components of the effervescent agent and pectin retain their own chemical properties prior to the contact with washing water. With "uniform mixing", an even distribution of the two compounds in the mixture is meant. Uniform mixing may preferably be achieved for example by mixing in a conventional rotary barrel drum or plug mill. Preferably an "intimate mixture" doesn't comprise other ingredients as the components being mentioned as intimately mixed, e.g. the effervescent agent and pectin, or at least one of the components of the effervescent agent and pectin.

The present invention furthermore provides such a co-granulate comprising or consisting of pectin and at least one component of the effervescent agent. Said co-granulate can be preferably used in cleaning or detergent tablets or water softener tablets. The co-granulate of the present invention preferably comprises an at least one of the acidic or basic components of the effervescent agent and pectin, more preferably it consists of at least one of the acidic or basic components of the effervescent agent and pectin. It is particularly pointed out that the co-granulate or the intimate mixture can comprise both components of the effervescent agent.

The co-granulate or the intimate mixture might comprise the (at least one component of) effervescent agent and pectin in any suitable amounts. Preferably, the ratio of the effervescent agent to pectin ranges from 0.5:1 to 1000:1; more preferably from 5:1 to 1000:1, even more preferably from 5:1 to 500:1 in the co-granulate or the mixture.

Preferably the co-granulate according to the invention comprises a water content ranging from 0 to 5, preferably from 0 to 4, more preferably from 0 to 3, even more preferably from 0 to 2, still even more preferably from 0 to 1, still even more preferably from 0 to 0.5, and most preferably from 0 to 0.25 wt.-% of the total composition. The water content is defined by the amount of water which evaporates when the composition or components are heated to 105° C.

Water Softener Composition

Besides the effervescent agent and pectin the water softener composition according to the invention may comprise at least one or more component(s) selected from: fillers, acidifiers, binders, builders, surfactants, bleaching agents or bleaching compositions, complexing agents, colorants, dyes, perfumes, disintegrants and preservatives. Preferably the composition comprises at least a filler or binder. In a particular embodiment the water softener composition comprises the components of the effervescent agent, pectin, a filler or binder, optionally a builder and optionally an acidifying agent or may consist of these ingredients.

Said one or more component(s) amounts(s) to 0.1 to 98 wt-% based on the total amount of the composition, preferably 0.5 to 90 wt.-% or 1 to 80 wt.-%, more preferred 2 to 60 wt.-%, even more preferred 3 to 40 wt.-% and most preferred 5 to 20 wt.-%, wherein it is meant that these amounts refer to the sum of all the "other" ingredients added to the water softener composition except the effervescent agent components and the pectin.

One of the preferred components of a water softener composition according to the present invention is a builder component, which might be a builder further representing a acidic component as mentioned above as the acidic component of the effervescent agent, e.g. citric acid as a builder. In case that such an acid is used as a builder, it is not clearly distinguishable between the amount of the acidic component of the effervescent agent and the amount of the builder in the total composition. In such case it should be considered as self-evident that the components of the water softener composition in any case amounts to a maximum of 100 wt.-%.

The water softener composition thus may comprise an acidic component suitable as an acidic component of the effervescent agent and further as a builder, a basic component of an effervescent agent, pectin and optionally a binder and/or filler, or it may consist of these components. In a preferred embodiment a water softener composition of the invention comprises citric acid, Na-bicarbonate, pectin and optionally a filler or binder, colorants or dyes, more preferred the water softener composition consists of these components. It is particularly preferred that the water softener composition is essentially free of Ca and Mg ions, thus, doesn't comprise any component including Ca or Mg, wherein "essentially free" means that the composition comprises less than 1% of such ions, preferably less than 0.5%, more preferred less than 0.2%, less than 0.1% or less than 0.05%. Most preferred the water softener composition is free of such ions.

The water softener composition of the present invention when solved in water provides an acidic pH due to the components of the composition. The pH obtainable by adding the composition into water is thus in the range of pH 1 to 6, preferably 2 to 5 and most preferred 3 to 5.5. This pH is obtained by applying a unit amount of a 14 g tablet into 1 l of water (20° C.) after full disintegration. A composition resulting in a solution providing said pH ranges is herein named "acidic" composition.

Preferably, the water softener composition according to the invention comprises a water content ranging from 0 to 5, preferably from 0 to 4, more preferably from 0 to 3, even more preferably from 0 to 2, still even more preferably from 0 to 1, still even more preferably from 0 to 0.5, and most preferably from 0 to 0.25 wt.-% of the total composition. The water content is defined by the amount of water which evaporates when the composition or components are heated to 105° C.

Detergent or Cleaning Composition

Preferably the detergent or cleaning composition according to the invention comprises at least one or more component(s) selected from: builders, surfactants, bleaching agents or bleaching compositions, acidifiers, complexing agents, binders, fillers, enzymes, colorants, dyes, perfumes, disintegrants and preservatives. More preferably the composition comprises at least one component selected from: builders, surfactants, bleaching agents or bleaching compositions and enzymes; most preferably the composition comprises at least a builder and/or a surfactant.

Said one or more component(s) amount(s) to 2 to 99 wt.-% based on the total weight of the composition, preferably 5 to 98 wt.-%, more preferred 7.5 to 97 wt.-%, even more preferred 10 to 95 wt.-% of the total weight of the composition.

It is particularly preferred that the detergent or cleaning composition is essentially free of Ca and Mg ions, thus, doesn't comprise any component including Ca or Mg, wherein "essentially free" means that the composition comprises less than 1% of such ions, preferably less than 0.5%, more preferred less than 0.2%, less than 0.1% or less than 0.05%. Most preferred the water softener composition is free of such ions.

A detergent or cleaning composition of the present application may result in an acidic pH as mentioned above for the water softener composition when dissolved in water (20° C., 20 g unit, 1 l of tap water) or it may provide an alkaline pH, i.e. a pH of 8 to 13, preferably a pH in the range of 8.5 to 11.5, more preferred 9 to 11, even more preferred 9.5 to 10.5 when 20 g are dissolved in 1 l of tap water (20° C.). The obtained pH depends from the ingredients of the detergent composition. If an acidic pH results from dissolving the composition, said composition is defined as being an "acidic" composition, if an alkaline pH is obtainable, the composition is defined as being "alkaline" or "basic".

Builders

The term "builder" as used herein includes sequestering (e.g., phosphates, aminopolycarboxylates and citrates) and precipitating builders (e.g., carbonates) but excludes materials that function primarily as alkalis such as caustic soda, caustic potash and alkaline silicates such as sodium metasilicate and amorphous silicates having an $SiO_2$ to $Na_2O$ ratio of greater than 1. The compositions of the invention may however comprise alkali metal silicates in order to provide protection against corrosion of metals and against attack on dishware, including china and glassware, and for pH control, although the compositions are preferably free of metasilicates. Metasilicates give rise to high pH compositions which can be aggressive, producing corrosion and attacking the dishware/tableware.

Builders suitable for use in the composition herein may preferably include builder which forms water-soluble hardness ion complexes (sequestering builder) such as citrates, aminopolycarboxylates and polyphosphates e.g. sodium tripolyphosphate and sodium tripolyphosphate hexahydrate, potassium tripolyphosphate and mixed sodium and potassium tripolyphosphate salts and builder which forms hardness precipitates (precipitating builder) such as carbonates e.g. sodium carbonate.

It can be suitable that the ratio of sequestering builder to precipitating builder is from about 10:1 to about 1:1, preferably from about 8:1 to 2:1 if both types are present in the builder system.

Alkali metal phosphate detergent builder salts suitable for phosphate-containing compositions according to the present invention include the polyphosphates, such as alkali metal pyrophosphate, alkali metal tripolyphosphate, alkali metal metaphosphate, and the like, for example, sodium or potassium tripolyphosphate (hydrated or anhydrous), tetrasodium or tetrapotassium pyrophosphate, sodium or potassium hexa-metaphosphate, trisodium or tripotassium orthophosphate and the like. Sodium tripolyphosphate is more preferred. The alkali metal nonphosphate detergent builder salts include sodium or potassium carbonate, sodium or potassium citrate, sodium or potassium nitrilotriacetate, and the like, wherein sodium carbonate is preferred.

The pH-adjusting system can be complemented (i.e. for improved sequestration in hard water) by other optional detergency builder salts selected from non-phosphate detergency builders known in the art, which include the various water-soluble, alkali metal, ammonium or substituted ammonium borates, hydroxysulfonates, polyacetates, and polycarboxylates. Preferred are the alkali metal, especially sodium, salts of such materials. Alternate water-soluble, non-phosphorus organic builders can be used for their sequestering properties. Examples of polyacetate and polycarboxylate builders are the sodium, potassium, lithium, ammonium and substituted ammonium salts of ethylenediamine tetraacetic acid; nitrilotriacetic acid, tartrate monosuccinic acid, tartrate disuccinic acid, oxydisuccinic acid, carboxymethyloxysuccinic acid, mellitic acid, and sodium benzene polycarboxylate salts.

When present, sodium and potassium, especially sodium, silicates are preferred. A particularly preferred alkali metal silicate is a granular hydrous sodium silicate having a SiO2:Na2O ratio of about 2.0 or about 2.4 available from PQ Corporation, named Britesil H20 and Britesil H24. Most preferred is a granular hydrous sodium silicate having a SiO2:Na2O ratio of 2.0. While typical forms, i.e., powder and granular, of hydrous silicate particles are suitable, preferred silicate particles have a mean particle size between about 300 and about 900 μm with less than 40% smaller than 150 microns and less than 5% larger than 1700 μm. Particularly preferred is a silicate particle with a mean particle size between about 400 and about 700 μm with less than 20% smaller than 150 microns and less than 1% larger than 1700 μm.

Alternate silicate-containing materials which can be used in the pH-adjusting component or as builders include zeolites, such as zeolites A and P, including recently described assertedly "maximum aluminium" variants; or, more preferably, layer silicates such as SKS-6, a wide variety of such silicates are available from Hoechst Corp. or from PQ Corp.

If present, one particularly preferred builder component is citrate.

Further suitable organic builders are salt of polycarboxylic acids, preferably of the polycarboxylic acids mentioned as acidifiers and/or of the polycarboxylic acids mentioned as the acidic component of the effervescent agent.

Builders can be present in the water softener composition in amounts of 0.1 to 60 wt.-%, wherein builders in detergent or cleaning compositions commonly represent 1 to 90 wt.-% of the total composition. Preferably a water softener composition comprises 0.5 to 50 wt.-%, more preferably 1, 2, 3, 4 or 5 wt.-% to 40, 30, 25 or 20 wt.-% of builder(s), whereas a cleaning or detergent composition may preferably comprise 2 to 80 wt.-%, more preferred 5, 8, 10, 15 or 20 wt.-% to 75, 70, 65 or 50 wt.-% of the builder(s). In all these compositions the mentioned ranges refer to the total amount of the added builders, thus, if a mixture of builders is comprised in the composition the sum of the added amounts shall be inside the mentioned ranges.

Surfactants

The water softener composition of the present invention might comprise 0.1 to 10 wt.-% of any surfactant(s), preferably 0.5 to 8 wt.-%, more preferred 1 to 6 wt.-%, most preferred 2 to 5 wt.-%. A cleaning or detergent composition may comprise 0.5 to 50 wt.-%, preferably 1 to 40 wt.-%, 2 to 30 wt.-%, 2.5 to 20 wt.-% or 3 to 15 wt.-% of any surfactant(s). In all these compositions the mentioned ranges refer to the total amount of the added surfactants, thus, if a mixture of surfactants is comprised in the composition the sum of the added amounts shall be inside the mentioned ranges.

Suitable surfactants for use in the composition herein may be nonionic surfactants, gemini surfactants, amphoteric surfactants, anionic surfactants, zwitterionic surfactants, cationic surfactants or a combination thereof, wherein anionic and non-ionic surfactants are particularly preferred.

One type of particularly preferred surfactants are anionic surfactants. Preferably such surfactants can be used having a melting point of at least 30° C. Such preferred surfactants having a melting point of 30° C. or higher are preferably essentially free of fatty acids or fatty alcohols.

Preferred anionic surfactants comprise or consist of a hydrophobic chain and an anionic hydrophilic group. The hydrophilic group can be a carboxylate, $C_nH_{2n+1}COO^-$ X, a sulphate, $C_nH_{2n+1}OSO^{3-}$X, a sulphonate, $C_nH_{2n+1}SO^{3-}$ X, phosphate, $C_nH_{2n+1}OPO(OH)O^-$ X, a sulphosuccinate, a isethionate, a taurate or an other anionic hydrophilic group.

Particularly preferred anionic surfactants are sulphates and sulphonates. Sulphate surfactants can be produced by a reaction of an alcohol with sulphuric acid, chlorosulphonic or sulphur dioxide and are esters of sulphuric acid. The surfactant properties can optionally be modified by for example introducing ethylene oxide units in the chain so it becomes an alcohol ether sulphate.

Suitable examples of preferred surfactants are alkyl benzene sulfonates, alkanesulfonates, fatty alcohol sulfates or similar suitable anionic surfactants. Common types of sulphonate surfactants are alkyl aryl sulphonate (e.g. sodium alkyl benzene sulphonate, naphthalene sulphonate, alkyl naphthalene sulphonate), paraffin sulphonates, linear alkyl benzene sulphonate (LABS), alpha-olefin sulphonates, sulphosuccinates (as mono- or di-esters or a mixture thereof). Alpha-olefin sulphonates can be prepared by reacting linear alpha-olefin with sulphur trioxide, yielding in a mixture of alkene sulphonates, 3- and 4-hydroxyalkane sulphonates, di-sulphonates and other species. The properties of sulphonate surfactants can optionally be modified by introducing ethylene oxide units in the chain.

Preferred alkyl phosphates and alkyl ether phosphates can be made by treating fatty alcohols or alcohol ethoxylates with a phosphorylating agent which yields in a mixture of mono- and di-esters of phosphoric acid.

Another preferred type of surfactants is a non-ionic surfactant commonly used e.g. in automatic dishwashing detergents, preferably a 'carry-over' surfactant. A 'carry-over' surfactant has the property that an amount of the surfactant remains in the dishwasher after the cleaning or rinsing cycles to give a performance during the final rinsing cycle and eventually the drying phase of the whole washing cycle of the dishwasher. This type of surfactant is e. g. described in EP 1 524 313 A more in detail.

Preferred nonionic surfactants are alkoxylated fatty alcohols, alkoxylated fatty acids or combinations thereof. The relative hydrophilic alkoxy-chain comprises or essentially consists of ethylene oxide, propylene oxide or butylene oxide or combinations thereof. The length of this chain can vary between averagely 1 and averagely 200 ethylene oxide-, propylene oxide- or butylene oxide-groups or combinations thereof, including 4, 6, 8, 10, 13, 15, 20, 25, 30, 40, 50, 80, 100 and the ranges between the particularly mentioned.

The relative hydrophobic hydrocarbon-chain from the fatty alcohol or fatty acid can be saturated, mono-unsaturated or poly-unsaturated and linear or branched. The length of this hydrocarbon-chain varies between 4 and 30 carbon molecules, including 6, 8, 10, 11, 12, 14, 16, 18, 20, 22, 24, 26 or 28.

Preferred surfactants of this type may be represented by the formula $R^1O(CH_2CH_2O)_x(CH(CH_3)CH_2O)_yH$, wherein $R^1$ is a linear or branched, saturated or unsaturated hydrocarbon residue having 4 to 30 C atoms, preferably 6 to 26, even more preferred 10 to 24 C atoms, x preferably is an integer of from 8 to 200, preferably from 20 or from 25 to 200, y preferably is an integer of at most 100 and x+y is below 200. In a preferred embodiment in at least one of the "carry over" surfactants x is at least 26, preferably at least 30, and even more preferred at least or more than 40, however, below 200. $R^1$ preferably is a linear, saturated hydrocarbon residue.

Particularly preferred are alcohol ethoxylates that can be prepared by ethoxylation of a fatty chain alcohol. The preferred alcohol ethoxylates have a hydrocarbon-chain that ranges from 4 up to 26 carbon molecules, including 4, 6, 8, 10, 12, 14, 16, 18, 20, 22 and between averagely 1 and averagely 200 ethylene oxide-groups, including averagely 4, 6, 8, 10, 13, 15, 20, 25, 30, 40, 50, 80, 100 ethylene oxide-groups.

Also preferred are fatty acid ethoxylates that can be prepared by a reaction of fatty acid with ethylene oxide or a polyglycol with the general formula $RCOO^-(CH_2CH_2O)_nH$. When a polyglycol is used a mixture of mono- and di-esters ($RCOO^-(CH_2CH_2O)_n$—OCOR) is produced. The preferred fatty acid has a hydrocarbon-chain R that varies from 4 up to 26 carbon molecules, including 4, 6, 8, 10, 12, 14, 16, 18, 20, 22. The number of ethylene oxide-groups in the fatty acid ethoxylate is between averagely 1 and averagely 200 ethylene oxide-groups, including averagely 4, 6, 8, 10, 13, 15, 20, 25, 30, 40, 50, 80, 100 ethylene oxide-groups.

Less preferred are alkyl phenol ethoxylates that can be prepared by ethoxylation of the appropriate alkyl phenol because this nonionic surfactant has undesired environmental/ecological properties.

Preferred are amine ethoxylates that can be prepared by addition of ethylene oxide to primary or secondary fatty amines. With primary amines both hydrogen atoms on the amine group react with ethylene oxide. This surfactants has a cationic character when there are a few ethylene oxide units and the pH is low. Under alkaline conditions the surfactants is water soluble when the alkyl chain is not long.

Preferred are ethylene oxide-propylene oxide co-polymers which may be prepared with a starting material that reacts with ethylene oxide (EO) or propylene oxide (PO) or a mixture of EO and PO (resulting in block copolymers). The starting materials that can be used are (difunctional) poly(oxypropylene glycol) or (difunctional) poly(oxyethylene glycol) or glycerol (for trifunctional products) or ethylene diamine (for tetrafunctional products).

Further preferred are sucrose esters that may be produced by esterification of sucrose with fatty acids or fatty glycerides. Alkyl polyglucosides (APG) may be produced by a reaction of a fatty alcohol with a glucose. Preferred APGs can have averagely one to averagely four glucose units and has a hydrocarbon-chain that varies from 4 up to 26 carbon molecules, including 4, 6, 8, 10, 12, 14, 16, 18, 20, 22.

Nonionic surfactants can be "end-capped" by a methyl or a ethyl group at the end of the alkoxy-chain. This effects the properties of the surfactant, e.g. it decreases the foaming behaviour. It is also known that nonionic surfactants can be "end-capped" with a fatty alcohol or a fatty acid where the hydrocarbon-chain varies from 4 up to 26 carbon molecules, including 4, 6, 8, 10, 11, 12, 14, 16, 18, 20, 22. The structure of the surfactants than is "hydrocarbon chain—alkoxy chain—hydrocarbon chain".

Preferred gemini-surfactants depend of the chosen tail, ion-group and spacer the Gemini-surfactant can have different properties.

The tail can for example consists of glucoside, polyglucoside or a hydrocarbon chain. The hydrocarbon chain can be saturated or unsaturated, branched or linear. The ion-group can be cationic (e.g. ammonium), anionic (e.g. phosphate, sulphate, carboxylate) or nonionic. The spacer can be short or long methylene groups, rigid (stilbene), polar (polyether, polyethyleenoxide), and nonpolar (aliphatic, aromatic).

Bleaching System

The water softener composition or the cleaning or detergent composition of the present invention might optionally comprise 0.5 to 10 wt.-% of a bleaching system. A cleaning or detergent composition according to the invention preferably comprises such a bleaching system.

If present, the bleaching system will generally contain a hydrogen peroxide source, as further defined hereinafter, whenever the bleach improving material or materials selected from the group consisting of:

i) organic peroxides, especially diacyl peroxides;
ii) bleach activators, e.g. quaternary substituted bleach activators;
iii) peracids, e.g. quaternary substituted peracids;
iv) bleach catalysts, e.g. transition-metal bleach catalysts;
v) peroxidase enzymes; and
vi) mixtures thereof do not themselves contain a source of bleaching oxygen. That is, when the bleach improving material (b) comprises only component (ii), (iv) or (ii)+(iv), then a hydrogen peroxide source must be added to complete a minimum bleach system. On the other hand, when the bleach improving material is selected from components (i), (iii), (v), and mixtures thereof, it is not essential to add a hydrogen peroxide source.

In preferred embodiments of the invention, a hydrogen peroxide source is provided regardless of whether the bleach improving material provides bleaching oxygen. The hydrogen peroxide source is typically hydrogen peroxide itself, or a compound which delivers hydrogen peroxide on dissolution, such as is the case with sodium perborate monohydrate, sodium perborate tetrahydrate, sodium percarbonate, or mixtures thereof. Coated forms of these solid hydrogen peroxide sources can be used.

Preferred hydrogen peroxide sources include sodium perborate, commercially available, e.g., in the form of mono- or tetra-hydrate; urea peroxyhydrate, sodium percarbonate, and sodium peroxide. Particularly preferred are sodium perborate, sodium perborate monohydrate and sodium percarbonate. Percarbonate is especially preferred because of environmental issues associated with boron. Many geographies are forcing legislation to eliminate elements such as boron from formulations.

Highly preferred percarbonate can be in uncoated or coated form. The average particle size of uncoated percarbonate ranges from about 400 to about 1200 microns, most preferably from about 400 to about 600 microns. If coated percarbonate is used, the preferred coating materials include carbonate, sulphate, silicate, borosilicate, and mixtures thereof.

The mole ratio of hydrogen peroxide to bleach-improving material in the present invention preferably ranges from about 10:1 to about 1:1. Highly preferred ratios range from about 10:1 to about 3:1.

Optionally, conventional nonionic or anionic bleach activators having in common that they do not contain quaternary nitrogen (herein together with their corresponding peracids for convenience all collectively identified as "nonquaternary bleach activators"), such as TAED, NOBS (nonanoyloxybenzenesulfonate), benzoyl caprolactam, benzoyl valerolactam, or mixtures thereof can be added to the compositions. Other optional bleaching materials of this nonquaternary class include the heterocyclic peroxycarboxylic acids of U.S. Pat. No. 5,071,584; nonquaternary bleach activators and mixtures such as those of U.S. Pat. No. 5,269,962; surface-active peroxyacids such as those of U.S. Pat. No. 4,655,781; hydrophilic or hydrotropic peroxyacids such as those of U.S. Pat. No. 4,391,723; and older peroxybenzoic acid peracids or activator derivatives such as those of U.S. Pat. Nos. 3,075,921 or 2,955,905.

The composition of the present invention might optionally comprise one or more bleach catalyst(s), preferably a transition metal bleach catalysts. Transition metal bleach catalysts can range from supported or unsupported transition metal salts, including but not limited to those of iron, manganese, copper, cobalt and ruthenium; see for example U.S. Pat. No. 3,398,096 simple water-soluble salts of iron and manganese such as the divalent, trivalent, tetravalent and quadrivalent salts; to more sophisticated catalysts such as those of the following references:

One group of usually used catalysts are those comprising manganese. Such compounds are well known in the art and include, for example, the manganese-based catalysts disclosed in U.S. Pat. Nos. 5,246,621, 5,244,594; 5,194,416; 5,114,606; and EP-A 549 271, EP-A 549 272, EP-A 544 440, and EP-A 544 490. Other metal-based bleach catalysts include those disclosed in U.S. Pat. Nos. 4,430,243 and 5,114,611. The use of manganese with various complex ligands to enhance bleaching is also reported in the following U.S. Pat. Nos. 4,728,455; 5,284,944; 5,246,612; 5,256,779; 5,280,117; 5,274,147; 5,153,161; and 5,227,084.

Iron or Manganese salts of aminocarboxylic acids in general are used; these include iron and manganese aminocarboxylate salts disclosed for bleaching in the photographic color-processing arts. A particularly useful transition metal salt is derived from ethylenediaminedisuccinate, and any complex of this ligand with iron or manganese can be used. One such catalytic system is described in assigned U.S. application Ser. No. 08/210,186, filed Mar. 17, 1994.

The bleach catalysts useful in machine dishwashing compositions and concentrated powder detergent compositions may also be selected as appropriate for the present invention. For examples of suitable bleach catalysts see U.S. Pat. Nos. 4,246,612 and 5,227,084.

See also U.S. Pat. No. 5,194,416 which teaches mononuclear manganese (IV) complexes such as Mn(IV) (1,4,7-trimethyl-1,4,7-triazacyclononane)-$(OCH_3)_3(PF_6)$, also referred to as Mn-TACN.

Still another type of bleach catalyst, as disclosed in U.S. Pat. No. 5,114,606, is a water-soluble complex of manganese (11), (111), and/or (IV) with a ligand which is a non-carboxylate polyhydroxy compound having at least three consecutive C—OH groups. Preferred ligands include sorbitol, iditol, dulsitol, mannitol, xylitol, arabitol, adonitol, meso-erythritol, meso-inositol, lactose, and mixtures thereof.

U.S. Pat. No. 5,114,611 teaches a bleach catalyst comprising a complex of transition metals, including Mn, Co, Fe, or Cu, with an non-(macro)-cyclic ligand.

Other examples include Mn gluconate, $Mn(CF_3SO_3)_2$, $Co(NH_3)_5Cl$, and the binuclear Mn complexed with tetra-N-dentate and bi-N-dentate ligands, including $(N_4Mn(III)(\mu-O)_2Mn(IV)N_4)^+$ and $[Bipy_2Mn(III)(\mu-O)_2Mn(IV)bipy_2]$-$(ClO_4)_3$.

The bleach catalysts may also be prepared by combining a water-soluble ligand with a water-soluble transition metal salt such as one of manganese in aqueous media and concentrating the resulting mixture by evaporation. Any convenient water-soluble salt of the transition metal can be used herein provided that the metal is one known to react with hydrogen peroxide. The (II), (III), (IV) and/or (V) oxidation states may be used.

Other bleach catalysts are described, for example, in EP-A 408 131 (cobalt complex catalysts), EP-A 384 503, and EP-A 306 089 (metallo-porphyrin catalysts), U.S. Pat. No. 4,728,455 (manganese/multidentate ligand catalyst), U.S. Pat. No. 4,711,748 and EP-A 224 952, (absorbed manganese on aluminosilicate catalyst), U.S. Pat. No. 4,601,845 (aluminosilicate support with manganese and zinc or magnesium salt), U.S. Pat. No. 4,626,373 (manganese/ligand catalyst), U.S. Pat. No. 4,119,557 (ferric complex catalyst), DE 2,054,019 (cobalt chelant catalyst) CA 866,191 (transition metal-containing salts), U.S. Pat. No. 4,430,243 (chelants with manganese cations and non-catalytic metal cations), and U.S. Pat. No. 4,728,455 (manganese gluconate catalysts).

A bleach catalyst, if present in the composition or co-granulate according to the invention, preferably comprises MnTACN.

Bleach Catalysts, when used in the present invention, are preferably segregated from the hydrogen peroxide source, or from QSBA's, QSP's or diacyl peroxides. A convenient approach, which can have the additional advantage of conferring a protective effect upon enzymes as used herein, is to process the enzymes with a coating of transition metal bleach catalyst, optionally with a waxy nonionic surfactant.

In another mode, transition-metal containing bleach catalysts can be prepared in situ by the reaction of a transition-metal salt with a suitable chelating agent. For example, a mixture of manganese sulfate and EDDS (See Chelating Agent disclosure hereinafter).

When highly colored, transition metal-containing bleach catalysts may be coprocessed with zeolites, such as zeolite A or zeolite P, so as to reduce the color impact and improve the aesthetics of the product.

As a practical matter, and not by way of limitation, the compositions and processes herein can be adjusted to provide on the order of at least one part per ten million of the active bleach catalyst species in the aqueous washing medium, and will preferably provide from about 0.1 ppm to about 700 ppm, more preferably from about 1 ppm to about 500 ppm, of the catalyst species in the wash liquor.

Acidifiers

By "acidifier/acidification agents" herein it is meant any component which when released, acts such as to reduce the pH of the wash solution containing the dissolved/dispersed composition. Suitable acidification agents for use in the composition of the present invention include inorganic and organic acids including, for example, carboxylate acids except tartaric acid, such as citric and succinic acids, polycarboxylate acids, such as polyacrylic acid, and also acetic acid, boric acid, malonic acid, adipic acid, fumaric acid, lactic acid, glycolic acid, tartronic acid, maleic acid, their derivatives and any mixtures of the foregoing. A preferred acidification acid is citric acid which has the advantage of providing builder capacity to the wash solution.

Complexing Agents/Sequestrans

Suitable metal ion complexing agents/sequestrants for use herein include organic phosphonates, such as amino alkylene poly (alkylene phosphonate), alkali metal ethane 1-hydroxy disphosphonates, and nitrilo trimethylene phosphonates.

Preferred among the above species are diethylene triamine penta (methylene phosphonate), hexamethylene diamine tetra (methylene phosphonate) and hydroxyethylene 1,1 diphosphonate.

The phosphonate compounds may be present either in their acid form or as a complex with either an alkali or alkaline metal ion, the molar ratio of said metal ion to said phosphonate compound being at least 1:1. Such complexes are described in U.S. Pat. No. 4,259,200 A. Preferably, the organic phosphonate compounds are in the form of their magnesium salt.

Other suitable metal ion complexing agents/sequestrants for use herein include nitrilotriacetic acid and polyaminocarboxylic acids such as ethylenediaminotetracetic acid, ethylenetriamine pentacetic acid, ethylenediamine disuccinic acid or the water soluble alkali metal salts thereof.

Especially preferred is ethylenediamine-N,N'-tetraacetic acid (EDTA) or ethylenediamine-N,N'-disuccinic acid (EDDS) or the alkali metal, alkaline earth metal, ammonium, or substituted ammonium salts thereof, or mixtures thereof. Preferred EDTA or EDDS compounds are the free acid form and the sodium or magnesium salt or complex thereof. Examples of such preferred sodium salts of EDDS include Na2 EDDS and Na3 EDDS. Examples of such preferred magnesium complexes of EDDS include MgEDDS and Mg2 EDDS. If present the magnesium complexes are the most preferred complexing agents for inclusion in compositions in accordance with the invention.

Still other suitable metal ion complexing agents/sequestrants for use herein are iminodiacetic acid derivatives such as 2-hydroxyethyl diacetic acid or glyceryl imino diacetic acid, described in EP 0317542 A2 and EP 0399133 A1.

The metal ion sequestrant herein can consist of a mixture of the above described species.

Binders/Disintegrants Others than Pectin

Materials which can be binders and/or disintegrants according to the present invention include organic materials such as starches, for example, corn, maize, rice and potato starches and starch derivatives, such as carboxymethyl starch, modified or pregelatinized starch and sodium starch glycolate; celluloses and cellulose derivatives, for example, carboxymethyl cellulose, cross-linked modified cellulose, and microcrystalline cellulose; sugars (for example, glucose, sucrose, lactose, mannitol, sorbitol, dextran, maltodextrin, mannitol); carrageenan, alginate; shellac; xanthan gum; naturally derived waxes like bees wax and hydrogenated jojoba wax, carnauba and rice bran wax and synthetic waxes, paraffin, talcum, gelatine, lanolin, and various synthetic organic polymers, notably polyethylene glycol and derivatives, polyvinylalcohol, polyvinylacetate, polyvinyl pyrrolidone, including for example cross-linked polyvinyl pyrrolidone, poly acrylic acid, including crosslinked polyacrylic acid; copolymers of acrylic acid and copolymers of methacrylic acid or derivatives thereof; polyacrylate; and derivatives and/or mixtures thereof. Inorganic swelling disintegrants include bentonite clay. It will also be appreciated that such material can also be filler material for the compressed form.

If present, the composition of the present invention may preferably comprise more than one binder/disintegrant, preferred binders of the composition of the invention include microcrystalline cellulose and/or cross-linked polyvinyl pyrrolidone.

More preferably the composition of the present invention does not comprise carboxymethyl cellulose. Still even more preferably, the composition of the present invention comprises microcrystalline cellulose and/or cross-linked polyvinyl pyrrolidone. Most preferred, the composition according to the present invention comprises microcrystalline cellulose and cross-linked polyvinyl pyrrolidone but lacks carboxymethyl cellulose.

The binder/disintegrant is preferably used in an combined amount within the range of from 0.1 to 15 wt.-%, more preferably from 0.5 to 10 wt.-%, most preferably from 1 to 8 wt.-% based on the total weight of the composition.

Fillers

If present, suitable fillers for use herein include alumina, aluminum silicate, amylodextrin, attapulgite, bentonite, betaglucan, biotite, calcium aluminum borosilicate, calcium carbonate, calcium caseinate, calcium phosphate, calcium silicate, calcium sodium borosilicate, calcium sulfate, cellulose, chalk, chitin, coconut (*Cocos nucifera*) shell powder, colloidal oatmeal, croscarmellose, dextran, dextrin, diatomaceous earth, cereal flour, meal and bran, fuller's earth, hectorite, hydrated silica, hydroxyapatite, hydroxypropyl starch phosphate, isomalt, kaolin, lithium magnesium silicate, lithium magnesium sodium silicate, loess, magnesium carbonate, magnesium carbonate hydroxide, magnesium silicate, magnesium stearate, magnesium sulfate, magnesium tallowate, magnesium trisilicate, microcrystalline cellulose, microcrystalline wax, montmorillonite, moroccan lava clay, nylon-6, nylon-11, nylon-12, nylon-66, peach (*Prunus persica*) pit powder, peanut (*Arachis hypogaes*) flour, pecan (*Carya lllinoensis*) shell powder, perlite, polydextrose, polyethylene, polyoxymethylene melamine urea, polyoxymethylene urea, polypropylene, potato (*Solanum tuberosum*) starch, PTFE, pumice, rayon, silica, silica dimethyl silylate, silica silylate, silk, silk powder, sodium hydroxypropyl starch phosphate, sodium magnesium silicate, soybean flour, sweet almond (*Prunus amygdalus dulcis*) meal, tale, tin oxide, titanium hydroxide, trimagnesium phosphate, walnut shell powder, wood powder, zinc borosilicate and zinc oxide, wherein microcrystalline cellulose is a particularly preferred filler.

Fillers may be present in the compositions of the invention in amounts from 0.1 to 10 wt. %.

Perfumes

Suitable perfumes include blooming perfumes, perfume oils, and perfume raw materials comprising alcohols, ketones, aldehydes, esters, ethers, nitriles alkenes, and mixtures thereof. Examples of ester type perfumes include benzylacetate, phenoxyethylisobutyrat, p-tert.-butylcyclohexylacetat, linalylacetat, dimethylbenzyl-carbinylacetate, phenylethyl acetate, linalyl benzoate, benzylformiate, ethylmethylphenyl glycinate, allylcyclohexyl propionate, styrallyl propionats and benzylsalicylate. Examples for ether type perfumes are benzylethylether, and for example linear $C_8$-18 alkanals, citral, citronellal, citronellyl oxyacetaldehyde, cyclamenaldehyde, hydroxycitronellal, lilial and bourgeonal, examples for ketones are ionones, alpha-isomethylionone and methyl-cedrylketone, examples for alcohols are anethol, citronellol, eugenol, geraniol, linalool, phenylethylalkohol and terpineol, examples for carbohydrates are terpene including limonen and pinen. Mixtures of different perfumes generating distinct fragrances may be preferred. These may include naturally occurring oils such as for example from pine, citrus, jasmine, patchouli, rose, ylang ylang, sage, camomille, cloves, balm, mint, orange flower, orange peel, sandel wood, neroliol, cinnamon, lime-tree blossom, juniper berry, vetiver, olibanum, galbanum and labdanum.

If present, the amount of perfumes may preferably be present in an amount of up to 2 wt.-%, more preferably in an amount of from 0.1 to 0.5 wt.-%, based on the total weight of the composition.

Colorants/Dyes

Suitable colorants and dyes include all kinds of colorants and dyes that are oxidized and thereby destroyed during the water softening, cleaning or washing process and mixtures thereof. Particularly suitable are colorants which are water soluble or soluble in at ambient temperature liquid organic solvents.

Suitable examples include anionic dyes like for example anionic nitroso dyes. One possible suitable dye is naphthol green (Colour Index (CI) part 1: Acid Green 1; Teil 2:10020), which is commercially available as Basacid™ Green 970 from BASF, (Ludwigshafen, Germany) and mixtures thereof with suitable blue dyes. Further suitable colorants are for example Pigmosol™ Blue 6900 (CI 74160), Pigmosol™ Green 8730 (CI 74260), Basonyl™ Red 545 FL (CI 45170), Sandolan™ Rhodamin EB400 (CI 45100), Basacid™ Yellow 094 (CI 47005), Sicovit™ Patentblue 85 E 131 (CI 42051), Acid Blue 183 (CAS 12217-22-0, CI Acidblue 183), Pigment Blue 15 (CI 74160), Supranol™ Blue GLW (CAS 12219-32-8, CI Acidblue 221), Nylosan™ Yellow N-7GL SGR (CAS 61814-57-1, CI Acidyellow 218) und/oder Sandolan™ Blue (CI Acid Blue 182, CAS 12219-26-0).

If present, the amount of colorants is preferably below 0.1 wt.-%, more preferably below 0.05 wt.-%.

Preservatives

Suitable preservatives for use herein include compounds with antimicrobial effect. If present suitable preservatives according to the present invention may be selceted from the group including alcohols, aldehydes, antimicrobial acids, carbonic acid esters, acid amides, phenols, phenol derivatives, diphenyls, diphenyl alkans, urea derivatives, oxygen-nitrogen-acetales, formales, benzamidines, substituted isothiazoles, and hydrated isothiazol derivatives, such as for example isothiazolinen and isothiazolidinen, phthalimid derivatives, pyridine derivatives, antimicrobial surfactants, such as for example antimicrobial quartarnary surfactants, guanidines, antimicrobial amphoteric compounds, chinoline, 1,2-dibrom-2,4-dicyanobutane, iodo-2-propynyl-butyl-carbamate, iodine, iodophore and peroxide including for example phenoxyethanol, undecylene acid, salicylic acid-saure, benzoeic acid, 2-benzyl-4-chlorphenol, 2,2'-methylen-bis-(6-brom-4-chlorphenol), 2,4,4'-trichlor-2'-hydroxy-diphenylether, N-(4-chlorphenyl)-N-(3,4-dichlor-phenyl)-urea, N,N'-(1,10-decandiyldi-1-pyridinyl-4-yliden)-bis-(1-octanamin)-dihydro-chlorid and N,N'-bis-(4-chlorphenyl)-3,12-diimino-2,4,11,13-tetraaza-tetradecandiimid-amide, as for example disclosed in H. Wailhausser "Praxis der Sterilisation, Desinfektion, Konservierung, Keimidentifizierung, Betriebshygiene" (5$^{th}$ edition, Stuttgart; New York: Thieme, 1995

Enzymes

Enzymes may be preferred components of the compositions, in particular of the cleaning or detergent compositions as disclosed herein. Where present, said enzymes are selected from the group consisting of cellulases, hemicellulases, proteases, gluco-amylases, amylases, xylanases, lipases, phospholipases, esterases, cutinases, pectinases, keratanases, reductases, oxidases, phenoloxidases, lipoxygenases, ligninases, pullulanases, tannases, pentosanases, malanases, glucanases, arabinosidases, hyaluronidase, chondroitinase, laccase, or mixtures thereof.

If present, particularly preferred enzymes include protease, amylase, lipase, cellulases, cutinase or mixtures thereof, optionally in conjunction with one or more plant cell wall degrading enzymes.

The above-mentioned enzymes may be of any suitable origin, such as vegetable, animal, bacterial, fungal and yeast origin. Origin can further be mesophilic or extremophilic (psychrophilic, psychrotrophic, thermophilic, barophilic, alkalophilic, acidophilic, halophilic, etc.). Purified or non-purified forms of these enzymes may be used. Also included by definition, are mutants of native enzymes. Mutants can be obtained e. g. by protein and/or genetic engineering, chemical and/or physical modifications of native enzymes. Common practice as well is the expression of the enzyme via host organisms in which the genetic material responsible for the production of the enzyme has been cloned.

Said enzymes are normally incorporated in the compositions herein at levels from 0.0001% to 2% of active enzyme by weight of the compositions/tablets. The enzymes can be added as separate single ingredients (pills, granulates, stabilized liquids, etc. containing one enzyme) or as mixtures of two or more enzymes (e. g. co-granulates). A range of enzyme materials and means for their incorporation into synthetic detergent compositions is also disclosed in WO 9307263 A2, WO 9307260 A1, WO 8908694 A1, U.S. Pat. No. 3,553,139 A1. Enzymes are further disclosed in U.S. Pat. No. 4,101,457, and in U.S. Pat. No. 4,507,219, . Enzyme materials useful for liquid detergent formulations, and their incorporation into such formulations, are disclosed in U.S. Pat. No. 4,261,868. Enzymes for use in detergents can be stabilised by various techniques. Enzyme stabilisation techniques are disclosed and exemplified in U.S. Pat. No. 3,600,319, EP 0 199 405 A2 and EP 0 200 586 A1.

Unit Portioned Tablets

The compositions of the present invention can be portioned and pressed in unit portions, preferably a tablet. Said unit portions comprise the effervescent agent, pectin and the other ingredients as mentioned above as further components of the respective composition. In such a unit portion the effervescent agent may represent 0.5 to 99 wt.-% of the portion in water softener compositions, preferably 1, 2, 3, 4, 5, 8, 10 or 15 wt.-% to 30, 40, 50, 60, 70, 80, 85, 90, 95, 97 or 98 wt.-%. In detergent or cleaning compositions the effervescent agent may represent 0.05 to 30 wt.-% of the total unit portion of the composition, preferably 0.1, 0.2, 0.4, 0.5, 0.75, 0.8, 1, 1.5, 2, 2.5, 3, 4, or 5 wt.-% to 8, 10, 12, 15, 18, 20 or 25 wt.-%.

In a composition comprising no enzyme and/or no bleaching agent, e.g. a water softener composition, the pectin or pectin comprising matter is included in the composition with an amount of less than 9.5 wt.-% and may represent 0.05 to 9 wt.-% based on the total weight of the unit portion composition, wherein in this embodiment the acid component used in the tablet is not tartaric acid. More preferably the amount of pectin or pectin comprising matter in such a composition may range from 0.075 to 8 wt.-%, even more preferred from 0.1 to 5 wt.-%, including 0.15 wt.-%, 0.2 wt.-%, 0.25 wt.-%, 0.3 wt.-%, 0.35 wt.-%, 0.4 wt.-%, 0.45 wt.-%, 0.5 wt.-%, 0.55 wt.-%, 0.6 wt.-%, 0.65 wt.-%, 0.7 wt.-%, 0.75 wt.-%, 0.8 wt.-%, 0.85 wt.-%, 0.9 wt.-%, 0.95 wt.-%, 1 wt.-%, 1.1 wt.-%, 1.15 wt.-%, 1.2 wt.-%, 1.25 wt.-%, 1.3 wt.-%, 1.35 wt.-%, 1.4 wt.-%, 1.45 wt.-%, 1.5 wt.-%, 1.55 wt.-%, 1.6 wt.-%, 1.7 wt.-%, 1.8 wt.-%, 1.9 wt.-%, 2.0 wt.-%, 2.1 wt.-%, 2.2 wt.-%, 2.3 wt.-%, 2.4 wt.-%, 2.5 wt.-%, 2.6 wt.-%, 2.7 wt.-%, 2.8 wt.-%, 2.9 wt.-%, 3 wt.-%, 3.5 wt.-%, 4 wt.-%, 4.5 wt.-%.

If tartaric acid is used as an acid component in the tablet in a particularly preferred embodiment of the invention the amount of pectin or pectin comprising matter in a composition not comprising any enzyme and/or bleaching component may be in the range of 0.05 to 2.48 wt.-% in the composition, wherein particularly amounts of 0.06 to 2.47 wt.-%, 0.075 to 2.46 wt.-%, 0.08 to 2.45 wt.-%, 0.09 to 2.42 wt.-% or 0.1 to 2.4 wt.-% based on the total weight of the composition are preferred. Thus, pectin or pectin comprising matter may be present in the tablet in amounts of 0.12 wt.-%, 0.15 wt.-%, 0.2 wt.-%, 0.25 wt.-%, 0.3 wt.-%, 0.35 wt.-%, 0.4 wt.-%, 0.45 wt.-%, 0.5 wt.-%, 0.55 wt.-%, 0.6 wt.-%, 0.65 wt.-%, 0.7 wt.-%, 0.75 wt.-%, 0.8 wt.-%, 0.85 wt.-%, 0.9 wt.-%, 0.95 wt.-%, 1 wt.-%, 1.1 wt.-%, 1.15 wt.-%, 1.2 wt.-%, 1.25 wt.-%, 1.3 wt.-%, 1.35 wt.-%, 1.4 wt.-%, 1.45 wt.-%, 1.5 wt.-%, 1.55 wt.-%, 1.6 wt.-%, 1.7 wt.-%, 1.8 wt.-%, 1.9 wt.-%, 2.0 wt.-%, 2.1 wt.-%, 2.2 wt.-%, 2.3 wt.-%, 2.4 wt.-%, or in amounts between these particularly mentioned values, e.g. 0.2 to 2.0 wt.-%.

In a composition comprising any enzyme and/or any bleaching agent, e.g. a detergent or cleaning composition, the pectin or pectin comprising matter is preferably included in the composition with an amount of less than 1.39 wt.-% and may represent 0.05 to 1.38 wt.-% based on the total weight of the unit portion composition. More preferably the amount of pectin or pectin comprising matter in such a composition may range from 0.075 to 1.37 wt.-%, even more preferred from 0.1 to 1.35 wt.-%, including 0.15 wt.-%, 0.2 wt.-%, 0.25 wt.-%, 0.3 wt.-%, 0.35 wt.-%, 0.4 wt.-%, 0.45 wt.-%, 0.5 wt.-%, 0.55 wt.-%, 0.6 wt.-%, 0.65 wt.-%, 0.7 wt.-%, 0.75 wt.-%, 0.8 wt.-%, 0.85 wt.-%, 0.9 wt.-%, 0.95 wt.-%, 1 wt.-%, 1.1 wt.-%, 1.15 wt.-%, 1.2 wt.-%, 1.25 wt.-%, 1.3 wt.-%, 1.31 wt.-%, 1.32 wt.-%, 1.33 wt.-%, 1.34 wt.-%, 1.35 wt.-% or in amounts between these particularly mentioned values, e.g. 0.2 to 1.3 wt.-%.

Of course also both types of compositions—water softener or cleaning or detergent composition—may comprise the pectin (comprising matter) in an amount of from 0.05 to less than 1.39 wt.-%, with the same preferred ranges as mentioned above, independent from any of the other ingredients of the remaining composition.

It has been found that such low amounts of pectin or pectin comprising matter are sufficient to provide increased stability to the (water softener or cleaning or detergent) tablets, even under humic conditions, whereas tablet disintegration is not affected disadvantageously.

The co-granulates and the compositions according to the present invention, in particular the water softener composition, may preferably be used separately or the co-granulates and/or tablets are used in automatic laundry or dishwashing formulations. However, the compositions may also be used to soften water in other cleaning processes such as hard surfaces cleaning using, for example, a hand-cloth or mop. The compositions according to the invention may also be used, for example, for cleaning windows, tiled surfaces, shower screens, dirty tableware and kitchenware, sanitary articles, cars or kitchen articles.

The compositions according to the invention are highly preferably water-soluble or water-dispersible.

Preferably, the composition is provided unit dose form. A unit dose may comprise a tablet, a sachet, spheres, cube(s), or any other suitable form allowing to provide a predetermined amount of the composition. A preferred form of a unit dose is a tablet as commonly used in automatic dishwashing devices or usually used for water softening applications.

The inventors have surprisingly found according to the present invention that pectin may be used in tabletted or unit portioned forms of detergent, cleaning and/or water softening compositions with an effervescence system to effectively stabilize said tablets or unit portions during storage, in particular during storage under humid conditions.

Although the tabletted or unit portions of the present invention show superior storage stability without a coating, the tablet may also be provided with a coating if desired. However, preferred are uncoated forms of the compositions and co-granulates of the present invention. If present, a suitable coating for use in the present invention may preferably comprise the polymers listed as binders and disintegrants above, more preferably a suitable coating does not comprise pectin.

A suitable method for preparing the composition or the co-granulate involves contacting an aqueous solution comprising pectin with either the acidic or the basic component of the effervescent agent, preferably in powder or particulate form and drying the composition thereby obtaining a co-granulate thereof. The obtained co-granulate may be co-granulated further with the other of basic or the acidic component of the effervescent agent in powder or particulate form.

However, a preferred method for the preparation of a co-granulate or the composition according to the invention comprises the steps of: a) mixing the pectin in powder or particulate form with all further desired ingredients including acidic and basic components of the effervescent agent, preferably in powder or particulate form, preferably thereby obtaining an intimate mixture, and compacting the resultant mixture into the desired granulate, unit dose or tablet form.

Appropriate methods of drying are, for example, spray drying, drum drying or freeze drying. Appropriate methods of compacting include well known processes such as tablet pressing.

EXAMPLES

A control formulation comprising 65 wt.-% citric acid, 27 wt.-% sodium bicarbonate, and 8 wt.-% binders and/or fillers, reference formulations (R1 to R4) additionally comprising 1 wt.-% of carboxymethyl cellulose (CMC) or 5 wt.-% of Dallicel (comprising cellulose and Sokalan CP45, a maleic acid-acrylic acid copolymer, BASF, Ludwigshafen, Germany) and sample formulations (A to G) additionally comprising 0.5 or 1 wt.-% pectin of different sources were pressed into tablets with a target hardness of 55 N and a target weight of 14.0 g (see Table 1). Tablet hardness was measured with a Dr. Schleuniger Tablet Tester 8M.

Figure 1:
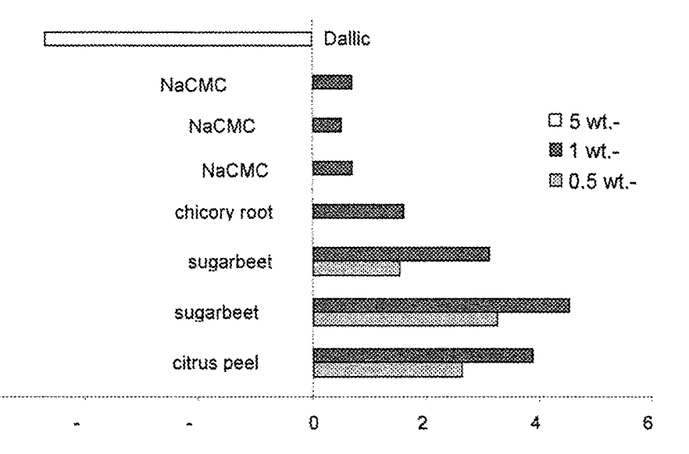
FIG. 1. Shows the change of tablet hardness of formulations comprising pectin or pectin-comprising matter in comparison to cellulose or CMC comprising formulations after four weeks of storage.

After pressing, tablet hardness was tested within one day and after four weeks of storage. Storage was performed at 37° C. in a closed, air-tight container, each container containing tablets of one composition only. Tablet hardness was measured after one day to ensure that correct pressure was applied during the compacting process. The initial hardness of all tablets was in the desired range of about 50 to 52 N. After 4 weeks of storage tablet hardness was measured again to determine the effect of the differing formulations on storage stability. Tablets comprising pectin showed a clear improvement in storage life, thus an increase in tablet hardness relative to the control formulation after four weeks of storage at 37° C. (FIG. 1). In addition, all pectin comprising tablets showed sufficient hardness (>30 N) even after four weeks of storage. CMC comprising reference tablets showed only minor improvement in remaining hardness relative to the control tablet. Dallicel comprising tablets were even less stable than the control formulation indicating that Dallicel reduces storage life of effervescent tablets. Interestingly, although showing improved hardness, pectin comprising formulations were still capable of disintegrating within less than 95 s when submerged in water after 4 weeks of storage (see Table 1).

The formulations and disintegration time of the tablets after 4 weeks are listed in Table 1 below. The effect of the additional component (pectin, CMC or Dallicel) on tablet hardness is shown in FIG. 1.

TABLE 1

Formulations and disintegration time of tablets after four weeks of storage

| Formulation | control | A | B | C | D | E | F | G | R1 | R2 | R3 | R4 |
|---|---|---|---|---|---|---|---|---|---|---|---|---|
| Citric acid | 65 | 65 | 65 | 65 | 65 | 65 | 65 | 65 | 65 | 65 | 65 | 65 |
| Sodium bicarbonate | 27 | 27 | 27 | 27 | 27 | 27 | 27 | 27 | 27 | 27 | 27 | 27 |
| Binders/Fillers | 8 | 8 | 8 | 8 | 8 | 8 | 8 | 8 | 8 | 8 | 8 | 8 |
| Citruspeel pectin | | 0.5 | 1 | | | | | | | | | |
| Sugarbeet pectin | | | | 0.5 | 1 | | | | | | | |
| Sugarbeet pulp | | | | | | 0.5 | 1 | | | | | |
| Chicory root pulp | | | | | | | | 1 | | | | |
| Aquasorb A500[1] | | | | | | | | | 1 | | | |
| Blanose 7HCF[2] | | | | | | | | | | 1 | | |
| Blanose 7HF[3] | | | | | | | | | | | 1 | |
| Dallicel[4] | | | | | | | | | | | | 5 |
| Disintegration time (4 wk) | 12 | 58 | 83 | 70 | 91 | 39 | 65 | 83 | 58 | 78 | 64 | n.d. |

[1]Sodium carboxymethly cellulose (E466), Ashland, Covington, USA
[2]Sodium carboxymethly cellulose granulate, Ashland, Covington, USA
[3]Sodium carboxymethly cellulose powder, Ashland, Covington, USA
[4]92% cellulose + 2% Sokalan CP45
n.d. not determined, tablet unstable

What is claimed is:

1. A water softener or detergent composition comprising:
   (i) an effervescent agent, and
   (ii) pectin or pectin comprising matter,
   (a) wherein said water softener composition comprises said pectin or pectin comprising matter in an amount of 0.05 to less than 9.5 wt. % relative to total amount of the water softener composition, wherein said water softener composition comprises no enzyme and/or no bleaching agent and further no tartaric acid, or
   (b) wherein said detergent composition comprises the pectin or pectin comprising matter in an amount of 0.05 to less than 1.39 wt. % relative to total amount of the detergent composition.

2. The water softener or detergent composition according to claim 1, wherein the effervescent agent comprises an acidic component selected from the group consisting of tricarboxylic acids, dicarboxylic acids except for tartaric acid, inorganic acids and an alkaline component, and a basic component.

3. The composition according to claim 1, comprising:
   a co-granule of an acidic component and/or a basic component of the effervescent agent and pectin, or an intimate mixture of the effervescent agent and pectin.

4. The composition according to claim 2, wherein the acidic component of the effervescent agent is present in an amount ranging from 9 wt. % to 98 wt. %.

5. The composition according to claim 1, wherein the pectin is selected from an extracted/isolated pectin and/or pectin-comprising matter or mixtures derivable from fruits, vegetables or crops.

6. The composition according to claim 1, wherein the ratio of the effervescent agent to the pectin ranges from 0.5:1 to 1000 to 1.

7. The composition according to claim 3, wherein the acidic component of the effervescent agent is selected from the group consisting of citric acid, isocitric acid, and derivatives thereof; oxalic acid, malonic acid, succinic acid, glutaric acid, malic acid, adipic acid, and derivatives thereof; amidosulfonic acid, and derivatives thereof; maleic acid, glutaconic acid, acrylic acid, methacrylic acid, and derivates thereof; and wherein the basic component of the effervescent agent is selected from the group consisting of sodium of potassium salts of carbonates, bicarbonates, percarbonates, sesquicarbonates, and derivatives thereof.

8. The composition according to claim 1, further comprising at least one or more components selected from the group consisting of builders, surfactants, bleaching agents, acidifiers, complexing agents, binders, fillers, colorants, dyes, perfumes, disintegrants, preservatives, and enzymes.

9. A co-granule comprising at least one of acidic or basic components of an effervescent agent and pectin,
   (a) wherein said co-granule comprises said pectin in an amount of 0.05 to less than 9.5 wt. % relative to total amount of the co-granule, wherein said co-granule comprises no enzyme and/or no bleaching agent and further no tartaric acid, or
   (b) wherein said co-granule comprises the pectin in an amount of 0.05 to less than 1.39 wt. % relative to total amount of the co-granule.

10. The composition according to claim 1, wherein water content in said composition ranges from 0 to 5 wt. %; preferably from 0 to 3 wt. %, more preferably from 0 to 1 wt. %, and most preferably from 0 to 0.25 wt. % relative to total amount of the composition.

11. A unit portion comprising the composition according to claim 1.

12. A method of stabilizing an effervescent detergent or a water softener tablet or particle, comprising adding pectin to the effervescent detergent or the water softener tablet or particle,
   (a) wherein said water softener tablet or particle comprises said pectin in an amount of 0.05 to less than 9.5 wt. % relative to total amount of the water softener tablet or particle, wherein said water softener tablet or particle comprises no enzyme and/or no bleaching agent and further no tartaric acid, or
(b) wherein said detergent comprises the pectin in an amount of 0.05 to less than 1.39 wt. % relative to total amount of the detergent.

13. A method of preparing a water-soluble and/or water-dispersible water softening formulation or detergent formulation, comprising adding a water softener or detergent composition to the water softening formulation or detergent formulation, wherein the water softener or detergent composition comprises pectin,
(a) wherein said water softening formulation comprises said pectin in an amount of 0.05 to less than 9.5 wt. % relative to total amount of the water softening formulation, wherein said water softening formulation comprises no enzyme and/or no bleaching agent and further no tartaric acid, or
(b) wherein said detergent formulation comprises the pectin in an amount of 0.05 to less than 1.39 wt. % relative to total amount of the detergent formulation.

14. A method for preparing the water softener or detergent composition according to claim 1 by mixing a composition comprising the pectin with the effervescent agent in a powder or granule form.

15. A water softener or detergent composition comprising:
(i) an effervescent agent, and
(ii) pectin or pectin comprising matter,
wherein the pectin is selected from pectin or pectin-comprising matter or mixtures derivable from chicory root, citrus peel or sugar beet.

16. The composition according to claim 15, wherein the pectin is derived from sugar beet.

17. A water softener or detergent composition comprising:
(i) an effervescent agent, and
(ii) pectin or pectin comprising matter,
wherein the acidic component of the effervescent agent is present in an amount ranging from 25 to 97 wt. % of total weight of the effervescent agent and/or the molar ratio of acid groups to carbonate-groups ($CO_3^{2-}$) or bicarbonate-groups ($HCO_3^-$) in the effervescent agent ranges from 8:1 to 1:1.

18. The composition according to claim 17, wherein the molar ratio of acid groups to carbonate-groups ($CO_3^{2-}$) or bicarbonate-groups ($HCO_3^{31}$ ) in the effervescent agent ranges from 5:1 to 2:1.

19. The composition according to claim 5, wherein the pectin is selected from extracted/isolated pectin and/or pectin-comprising matter or mixtures derivable from sugar beet, chicory/chicory root, sunflower, rapeseed/rapeseed cake, carrot, citrus peel/citrus fruit including lemon, lime, orange, grapefruit; and non-citrus fruit including apple, pear, apricot, guave, mango, plum, grapes, peach, quince, papaya, banana, pineapple, passion fruit and coffee berry, or mixtures thereof.

20. The composition according to claim 5, wherein the pectin is selected from extracted/isolated pectin and/or pectin-comprising matter or mixtures derivable from sugar beet.

21. The composition according to claim 6, wherein the ratio of effervescent agent to the pectin ranges from 5:1 to 1000:1.

22. The composition according to claim 3, wherein the acidic component of effervescent agent is citric acid, and wherein the basic component of effervescent agent is sodium or potassium bicarbonates.

23. The composition according to claim 1, wherein the amount of the pectin or pectin comprising matter included in the water softener or detergent composition is between 0.1 wt. % and 1.2 wt. % relative to total amount of the water softener or detergent composition.

24. The composition according to claim 1, wherein the amount of the pectin or pectin comprising matter included in the water softener or detergent composition is between 0.5 wt. % and 1 wt. % relative to total amount of the water softener or detergent composition.

25. The composition according to claim 1, wherein the amount of the effervescent agent included in the water softener or detergent composition is between 80 wt. % and 99 wt. % relative to total amount of the water softener or detergent composition.

26. The composition according to claim 1, wherein the amount of the effervescent agent included in the water softener or detergent composition is between 92 wt. % and 95 wt. % relative to total amount of the water softener or detergent composition.

27. The composition according to claim 1, further comprising a binder or a filler, wherein the amount of the binder or filler included in the water softener or detergent composition is between 5 wt. % and 20 wt. % relative to total amount of the water softener or detergent composition.

28. The composition according to claim 1, further comprising a binder or a filler, wherein the amount of the binder or the filler included in the water softener or detergent composition is between 5 wt. % and 8 wt. % relative to total amount of the water softener or detergent composition.

* * * * *